INVENTOR:
SYDNEY THOMAS JEFFREYS

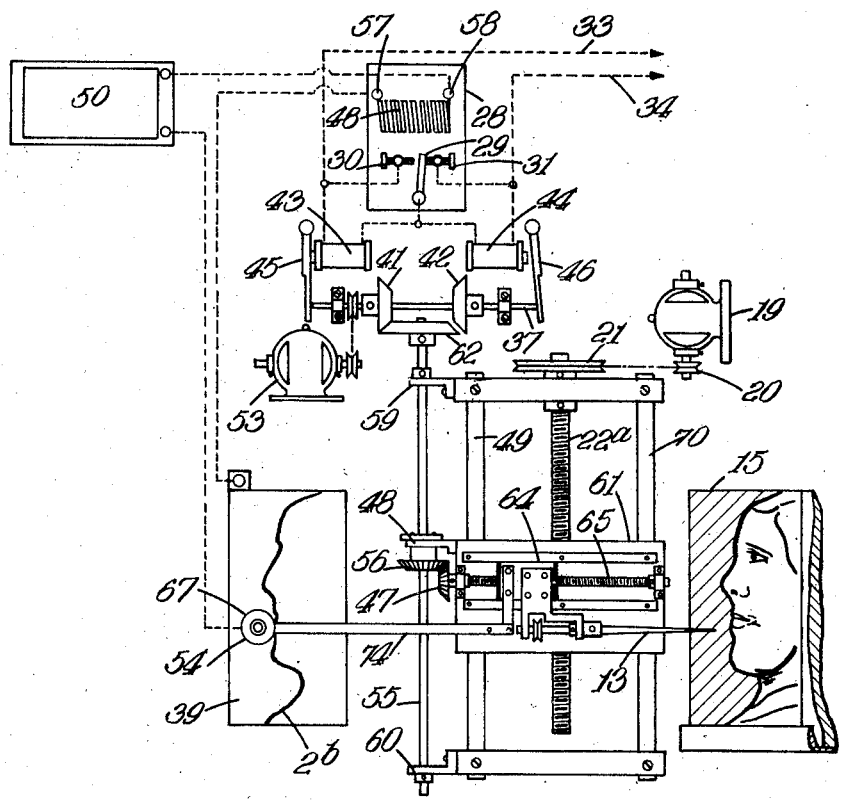

Patented Apr. 30, 1940

2,199,103

UNITED STATES PATENT OFFICE 2,199,103

AUTOMATIC CONTROL MEANS FOR ELECTRICALLY DRIVEN TOOLS

Sidney Thomas Jeffreys, Newport, England, assignor to Photosculpture Limited, Newport, England, a British company Application May 13, 1937, Serial No. 142,431
In Great Britain May 21, 1936

4 Claims. (Cl. 90—13.1)

This invention relates to automatic control means for electrically driven tools, such as drilling, milling, and other cutting tools. The invention is especially useful in connection with tools for use in photosculpture, wherein the movements of a tool operating on a block of plastic or other material to be shaped are controlled in dependence on an outline previously drawn or photographically recorded.

According to this invention in a lathe, mechanical sculpturing or carving machine or the like constructed so that the travel of the cutting tool in the direction at right angles to its axis (hereinafter called "the longitudinal travel") is mechanically effected, the extent of the feeding and withdrawal movement is electrically controlled by a tracer contact device in such a manner that the cutting tool during its complete longitudinal travel inscribes in the workpiece, block or substance it is cutting a cut corresponding in shape to an outline which is traced, or placed, on a screen (hereinafter called "the control screen") which forms an integral or component part of the cutting machine.

The result may be obtained by reproducing the outline in insulating ink, paint, or other suitable insulating medium upon a metal, metallised or other electrical conducting surface, and the break of the electrical circuit is effected by the insulated outline breaking a circuit including a platinum or other suitable point (hereinafter called "the pointer contact") which bears upon the conducting surface upon which the outline is marked.

In order that the said invention may be clearly understood and readily carried into effect the same will now be more fully described with reference to the accompanying drawings or diagrams illustrating four exemplifications of the invention.

Figure 3 represents diagrammatically apparatus working in accordance with outlines on a fixed screen, this second arrangement being suitable for use either in a horizontal or vertical position.

Figure 1:
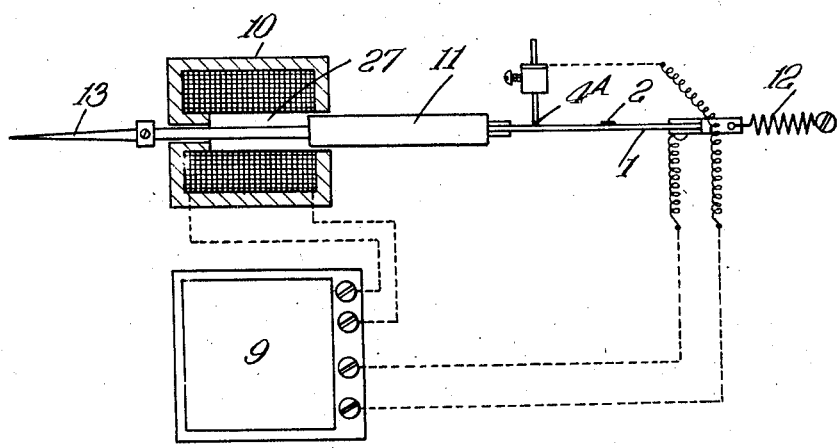
Figure 1 represents in sectional elevation and Figure 2 in plan a practical arrangement involving the use of a moving screen.
Figure 2:
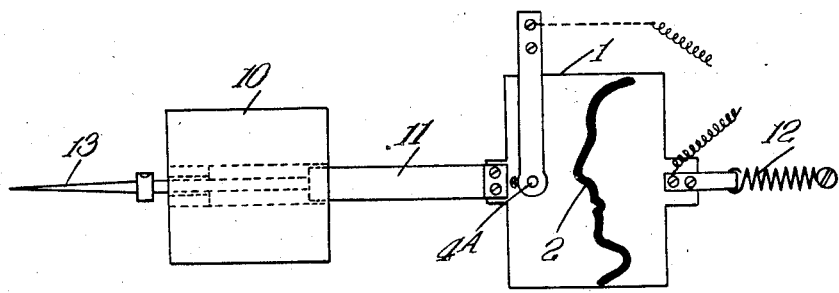

In the example given in Figures 1 and 2, an iron core 11 is so arranged that when a solenoid 10 is electrically energised the said core is drawn into the centre 21 of the solenoid. The cutting tool 13, the iron core 11 and a screen 1 (hereinafter together referred to as "the moving parts") are rigidly connected and move together. A spring 12 is attached to these components and is adapted to exert a tension in the opposite direction to the pull of the solenoid 10, and the said spring operates when the solenoid is de-energised to withdraw the core from the centre of the solenoid 10 and the cutting tool 13 from the material intended to be cut. The screen 1 has an electrical conducting surface or has imposed upon it a sheet with an electrical conducting surface upon which is marked in insulating substance the outline 2 desired to be followed by the cutting tool 13. Screen 1 or the sheet mentioned is preferably one of a successive series of replaceable screens or sheets, but in every case, the feature holds that a conducting portion has a non-conducting line or area applied thereon defining the picture or matter to be traced. A pointer contact 4a of platinum or other suitable substance is immovably mounted to make a continuous rubbing contact with the surface of the screen 1 as the screen moves. The solenoid 10 is energised by current from any suitable source of electric supply direct or through a relay or amplifier 9 which is connected with the contact 4a and the conducting surface of the screen 1 in such a manner that the current required to energise the solenoid 10 only passes when the pointer contact 4a is in contact with the conducting surface of the screen 1, and so that when that contact is broken the solenoid is de-energised. It will readily be seen that when the pointer contact 4a is in contact with the conducting surface of the screen, the solenoid 10 being energised causes the moving parts to move in the direction corresponding to the feeding movement of the drill 13, this movement continuing until the non-conducting outline 2 marked on the surface of the screen 1 breaks the contact between the pointer contact 4a and the conducting surface of the screen, whereupon the solenoid 10 becomes de-energised and the movement of the moving parts is reversed by the pull of the spring 12.

By a further modification within the scope of this invention, in cases where it is necessary or desirable that the feeding and withdrawal movement of the cutting tool should be actuated by mechanical power, instead of the cutting tool being directly connected with and depending for its lateral movement upon the movement of the iron core in the solenoid, the making and breaking of the electrical circuit may operate a reversing gear which controls the mechanism operating the lateral movement of the cutting tool, causing the cutting tool to move outwards of the block or inwards of the block according to whether the circuit is interrupted by the outline or not so interrupted. A method by which this modification of the invention may be performed will now be described by reference to Figure 3.

Upon two guides 49 and 70 is mounted a table 61 adapted to travel in one plane backwards and forwards in a direction corresponding with the longitudinal travel of a cutting tool 13. The travel of the table 61 is operated by the threaded rod 22a at one end of which is fixed a pulley 21 which is rotated by the motor 19. Upon the table 61 is a smaller table 64 mounted to move backwards and forwards in a direction at right angles to the movement of table 61, that is to say in the direction corresponding with the feeding and withdrawal movement of the cutting tool 13. The movement of the smaller table 64 is operated by rotation of the threaded rod 65.

Attached to the smaller table 64 is an arm 74 which carries a pointer contact 67 (which is electrically insulated from the arm by the holder 54) so that according to the direction of rotation of the threaded rod 65 the pointer contact may be made to adjust itself to the position of an outline 2b in the screen 39. Also mounted upon the smaller table 64 is the cutting tool 13 the axis of which is parallel to that of the threaded rod 65. The cutting tool may be a rotating drill or milling tool operated by a suitable motor mounted on the smaller table 64 or by any suitable form of transmission from another motor. As may readily be seen, upon the table 61 being carried along the guides 49 and 70 by the rotation of the threaded rod 22a, the pointer contact 67 may be made by the rotation in one direction or the other of the threaded rod 65 to follow any outline which may appear upon the screen 39 and the cutting tool will make a cut of corresponding shape in any block 15 which may be placed in position.

The threaded rod 65 is rotated by a bevelled gear wheel 47 fitted to one end, which is held constantly in mesh with the bevelled gear wheel 56 by the bracket 48 which is fitted to the table 61. In the gear 56 is a square bearing hole through which a square section rod 55 passes allowing the gear wheel 56 free sliding movement along the rod 55 so that the threaded rod 65 rotates in unison when the square section rod 55 is rotated, at any point in or during the longitudinal travel of the table 61. The rod 55 is free to rotate in bearings 59 and 60 but is mainly of square section, and at one end of the square section rod 55 is mounted a bevel friction gear 62. Adjacent the friction gear 62 are two further friction gears 41 and 42 which are fixed to and rotate with the shaft 37. The shaft 37 is constantly rotated by the motor 53 and is mounted in bearings which allow the shaft 37 to move axially so as to place in engagement at one extremity of its movement the friction gears 62 and 41 and at the other extremity of its movement friction gears 62 and 42. The shaft 37 being in constant rotation, the direction of rotation of the square section rod 55 (and consequently the direction of the lateral movement of the smaller table 64) depends upon which of the friction gears 41 and 42 is in contact with the friction gear 62. The axial movement of the shaft 37 is controlled by an electrical circuit so devised that when the pointer contact 67 is in contact with the conducting surface of the screen 39, the one of the friction gears 41 or 42 is in contact with the friction gear 62 which causes the cutting tool to move laterally in its feeding movement, and when the contact between the conducting surface of the screen 39 and the pointer contact 67 is broken by the insulated outline 2b the shaft 37 moves axially to engage the other of the said friction wheels and so cause the withdrawal movement of the cutting tool to take place. The axial movement of the shaft 37 is operated by two electromagnets 43 and 44 and two pivoted armatures 45 and 46. When the electromagnet 43 is energised and attracts the armature 45, the shaft 37 is moved until the friction bevel 41 engages with the friction bevel 62. Conversely when the electromagnet 44 is energised the armature 46 moves the shaft 37 in the opposite direction until the friction bevels 42 and 62 are engaged. The alternate operations of the electromagnets 43 and 44 are effected by a moving contact point 29 forming part of a relay 28 which makes contact either with the electrical contact points 30 or 31 in the relay.

Terminals 57 and 58 of the relay are connected respectively to the pointer contact 67 and the conducting surface of the screen 3 via a source of electric supply 50, so that when the pointer contact 67 is in contact with the metallised surface of the screen 3 an electrical circuit is completed through the relay operating coil 48; when this circuit is complete the moving contact point 29 in the relay moves into contact with contact point (30 or 31) which causes the feeding movement of the cutting tool 13 to occur, but when the said electrical circuit is broken by the pointed contact 67 being insulated from the metallised surface of the screen 3 the moving contact point 29 in the relay makes contact with the other of the contact points 30 or 31 and thereupon the withdrawal movement of the cutting tool commences.

In Figure 3 the electric wiring is illustrated by the dotted lines, the wiring 33 and 34 indicating the electric supply for operating the magnets 43 and 44.

From the foregoing description of the arrangement illustrated in Figure 3, it will readily be seen that during a movement longitudinally of the table 61, the pointer contact 67 being set at the commencement of the movement in a position corresponding to the withdrawn position of the cutting tool, the pointer contact 67 being in contact with the metallised surface of the screen will electrically operate the mechanism causing the cutting tool 13 to move inwards of the block until the pointer contact reaches the insulated outline 2b, when the reversing mechanism is operated and causes the cutting tool to move outwards of the block, and as the longitudinal movement of the table 61 continues the lateral position of the pointer contact will be controlled by and will follow the insulated outline 2b appearing on the screen 3.

What I claim and desire to secure by Letters Patent of the United States is:

1. In a machine for use in photosculpture in three dimensions, having an electrically driven and movably supported tool, means to impart to said tool a lateral feeding and withdrawal movement and a longitudinal movement at right angles to the directions of said feeding and withdrawal movement, a control screen having an electrical conducting surface with an image outline mask thereon of insulating material, and a tracer contact device forming a part of an electrical circuit with a tracer adapted to move in contact with said outline to effect the making and breaking of said electrical circuit, the combination of means controlled by said circuit to effect rapid alternations of the feeding and withdrawal movements of the tool to cause the tool during its travel at right angles to inscribe in the workpiece individual cuts of varying depth in a direction at right angles to the surface of said workpiece according to said outline mask, and having said tool pointing in the same direction as that of the feeding movement of the tracer, with the portion of the workpiece being cut facing said tracer.

2. A machine for use in the art of photosculpture in three dimensions, comprising an electrically driven and movably supported tool, means to impart to said tool a lateral feeding and withdrawal movement and a longitudinal movement at right angles to said feeding and withdrawal movement, a control screen having an electrical conducting surface with an outline mask thereon of insulating material, a tracer contact device forming a part of an electrical circuit and having while in contact with said outline mask a corresponding feeding and withdrawal movement to that of the tool in order to effect the making and breaking of said electrical circuit, the said tool pointing in the same direction as that of the feeding movement of the tracer contact device so as to engage the face of a workpiece facing in the direction of the withdrawal movement of the tracer contact device, with means controlled by said circuit to effect rapid alternations of the feeding and withdrawal movements of the tool in order to cause the tool during its travel at right angles to inscribe in the workpiece a cut corresponding to said outline mask, and thus by repeated strokes of the tool on successive parts of the workpiece with one of a series of replaceable outline masks, to produce a three-dimensional model.

3. In a machine for use in the art of photosculpture in three dimensions, having an electrically driven and movably supported tool, means to impart to said tool a constant longitudinal travel, a control screen having an electrical conducting surface with replaceable image outline mask thereon of insulating material forming one of successive series, a tracer contact device forming a part of an electrical circuit including said surface, said device having a tracer adapted to be moved in unison with said longitudinal travel of the tool in contact with said outline to effect the making and breaking of said electrical circuit, means to impart to said tool lateral feeding and withdrawal movements at right angles to said longitudinal travel, said last named means being controlled by said electrical circuit to effect rapid alternations of the feeding and withdrawal movements of the tool to cause the tool during its travel at right angles to inscribe in the workpiece individual cuts of varying depth in a direction at right angles to the surface of said workpiece as determined by said outline mask, and having said tool pointing in the same direction as that of the feeding movement of the tracer, with the portion of the workpiece being cut facing said tracer.

4. In a machine for use in the art of photosculpture in three dimensions, having an electrically driven and movably supported tool, a control screen having an electrical conducting surface with an image outline mask thereon of insulating material, a tracer contact device forming a part of an electrical circuit including said surface, said control screen being longitudinally movable relatively to said tracer contact device, a tracer on said device adapted to move laterally in contact with said outline to effect the making and breaking of said electrical circuit, means to impart to said tool lateral feeding and withdrawal movements at right angles to said longitudinal travel, said last named means being controlled by said electrical circuit to effect rapid alternations of the feeding and withdrawal movements of the tool to cause the tool during its travel at right angles to inscribe in the workpiece individual cuts of varying depth in a direction at right angles to the surface of said workpiece according to said outline mask, and having said tool pointing in the same direction as that of the feeding movement of the tracer, with the portion of the workpiece being cut facing said tracer.

SIDNEY THOMAS JEFFREYS.